(12) United States Patent
De Meyer et al.

(10) Patent No.: US 7,267,141 B1
(45) Date of Patent: Sep. 11, 2007

(54) METHOD OF ON-SITE PRODUCTION OF NOVEL TEXTILE REINFORCED THERMOPLASTIC OR THERMOSET PIPES

(75) Inventors: Willy De Meyer, Drogen (BE); Michael W. Gilpatrick, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 2052 days.

(21) Appl. No.: 09/587,634

(22) Filed: Jun. 5, 2000

(51) Int. Cl.
*F16L 55/18* (2006.01)
*B28B 17/00* (2006.01)

(52) U.S. Cl. ............... 138/97; 405/156; 405/180; 425/62; 425/377

(58) Field of Classification Search .......... 425/62, 425/377, 155, 200, 306, 380; 405/179, 180, 405/155, 156; 156/149; 264/33; 138/97
See application file for complete search history.

(56) References Cited

U.S. PATENT DOCUMENTS

| 2,718,684 | A | * | 9/1955 | Bjorksten ............... 264/31 |
|---|---|---|---|---|
| 3,230,722 | A | * | 1/1966 | Coulter et al. ............ 405/155 |
| 3,332,249 | A | * | 7/1967 | Idoine ................ 405/179 |
| 3,456,449 | A | * | 7/1969 | Heil .................. 405/156 |
| 4,116,743 | A | | 9/1978 | Davis ................. 156/333 |
| 4,437,789 | A | * | 3/1984 | Kasiewicz ............... 405/156 |
| 4,668,319 | A | * | 5/1987 | Piccoli ................. 156/149 |
| 4,770,915 | A | | 9/1988 | Nakagawa et al. .......... 428/74 |
| 5,014,755 | A | | 5/1991 | Bompard et al. .......... 139/420 A |
| 5,229,056 | A | | 7/1993 | De Meyer et al. ......... 264/173 |
| 5,691,030 | A | | 11/1997 | De Meyer ............... 428/107 |
| 5,698,282 | A | | 12/1997 | De Meyer ............... 428/36.1 |
| 6,455,115 | B1 | | 9/2002 | DeMeyer et al. .......... 428/36.2 |
| 6,460,575 | B1 | | 10/2002 | DeMeyer et al. .......... 138/125 |
| 6,627,281 | B2 | | 9/2003 | DeMeyer ............... 428/36.1 |
| 6,663,808 | B2 | | 12/2003 | DeMeyer ............... 264/171.26 |
| 6,899,842 | B1 | * | 5/2005 | Corre et al. ............. 264/459 |

* cited by examiner

*Primary Examiner*—Patrick F. Brinson
(74) *Attorney, Agent, or Firm*—Terry T. Moyer; Charlotte C. Wilson

(57) ABSTRACT

Novel thermoplastic pipes which can withstand extremely high internally generated and/or applied pressures for utilization within, primarily, high pressure underground liquid and gas transport systems are provided. Such pipes are improvements over standard metal (i.e., steel, lead, and the like) pipes due to construction costs, shipping costs, implementation costs (particularly underground), modulus strength allowances to compensate for underground movements (i.e., earthquakes and tremors), non-rusting characteristics, and ease in manufacture. Such pipes are preferably reinforced with specific fabric articles which permit a lower thickness of plastic to be utilized than is generally required to withstand high pressure situations. A one-step, potentially on-site production method, is also contemplated within this invention.

3 Claims, 6 Drawing Sheets

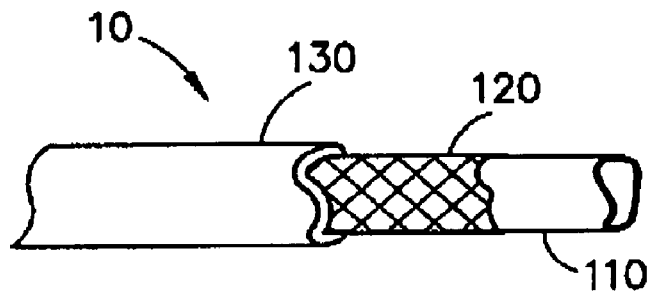
FIG. -1-
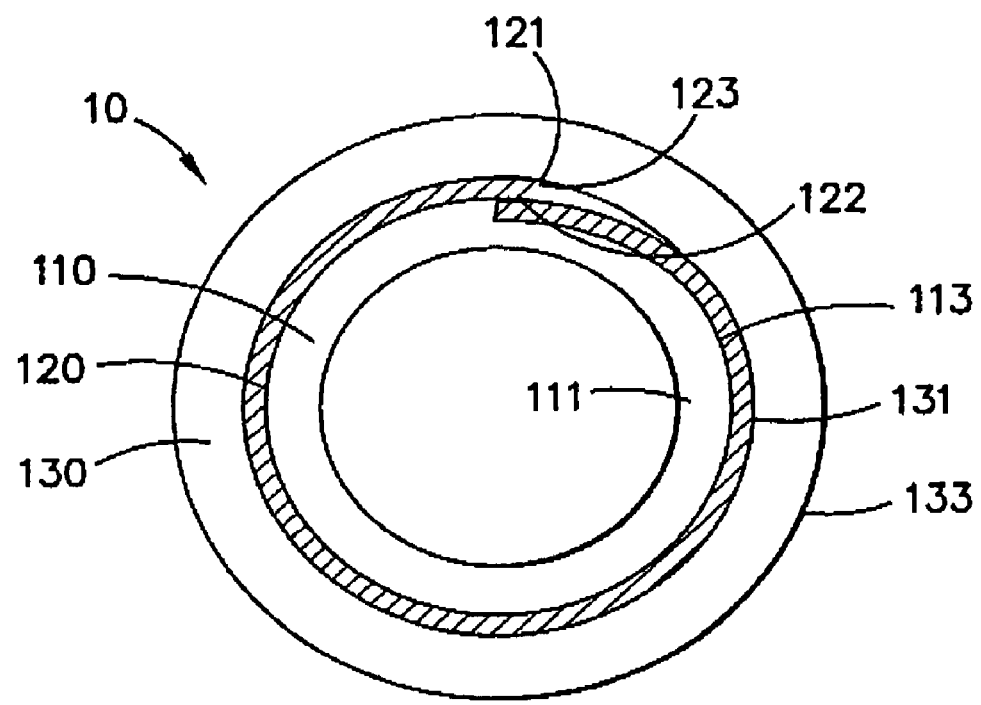
FIG. -2-

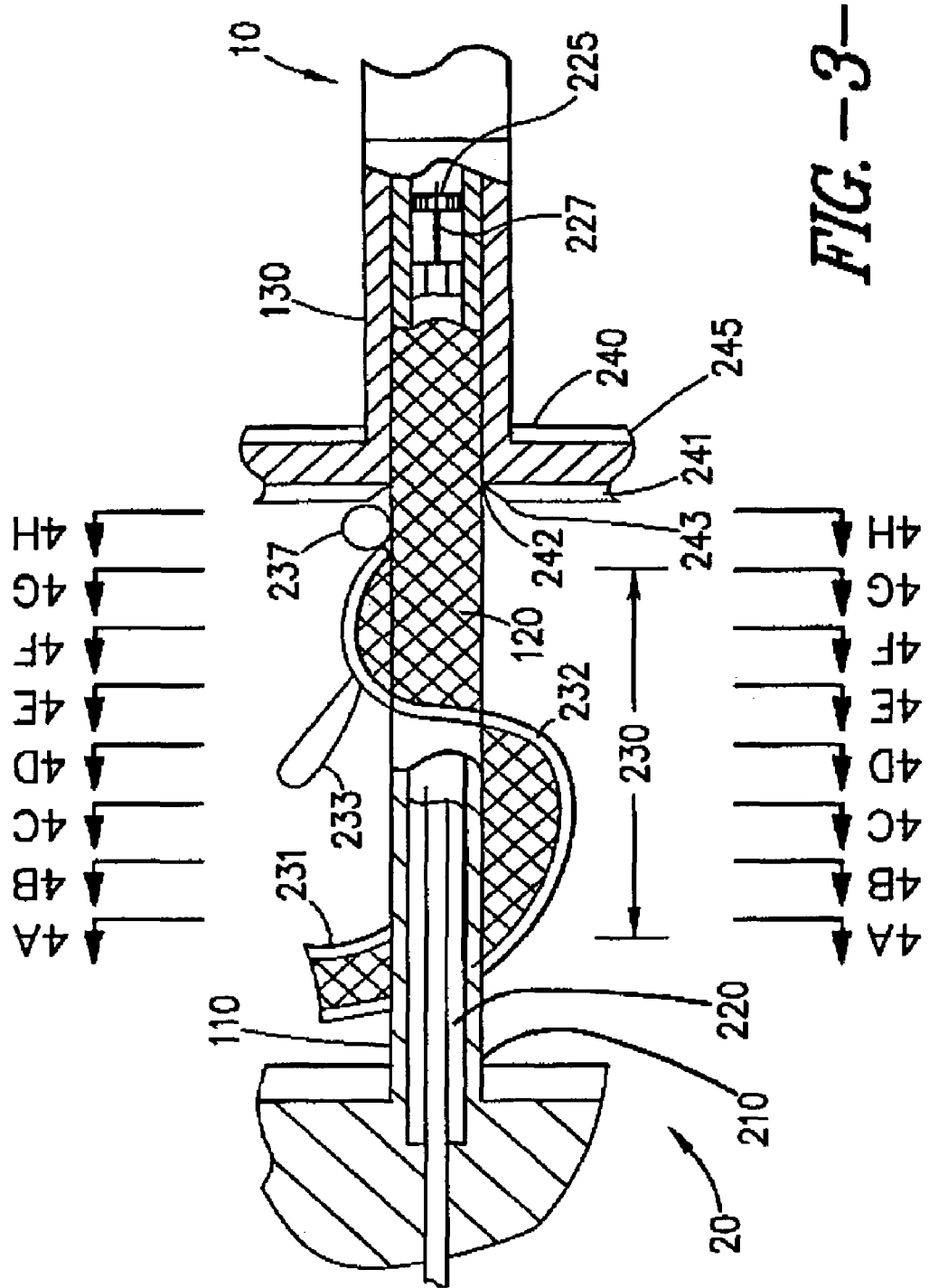
FIG. -3-

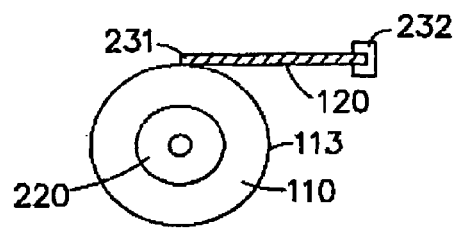
FIG. —4A—
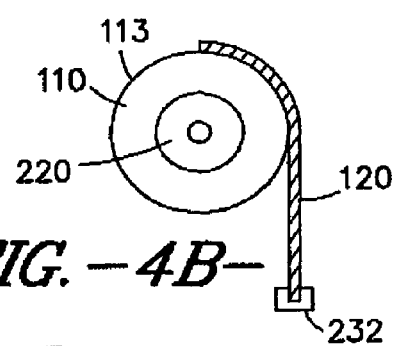
FIG. —4B—
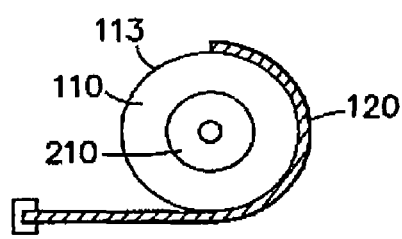
FIG. —4C—
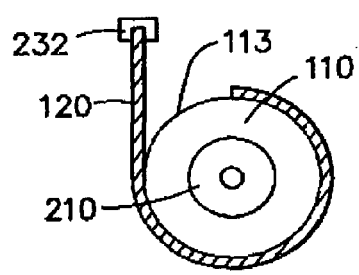
FIG. —4D—
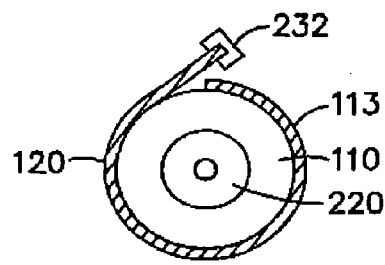
FIG. —4E—
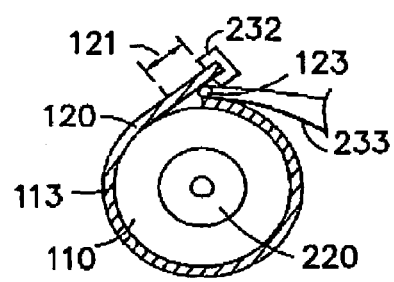
FIG. —4F—
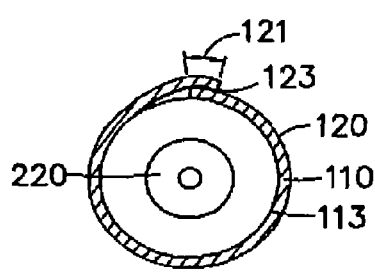
FIG. —4G—
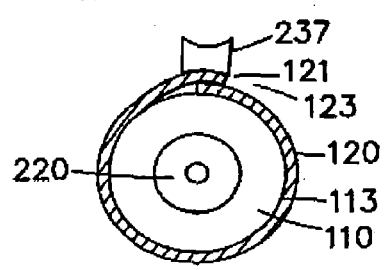
FIG. —4H—

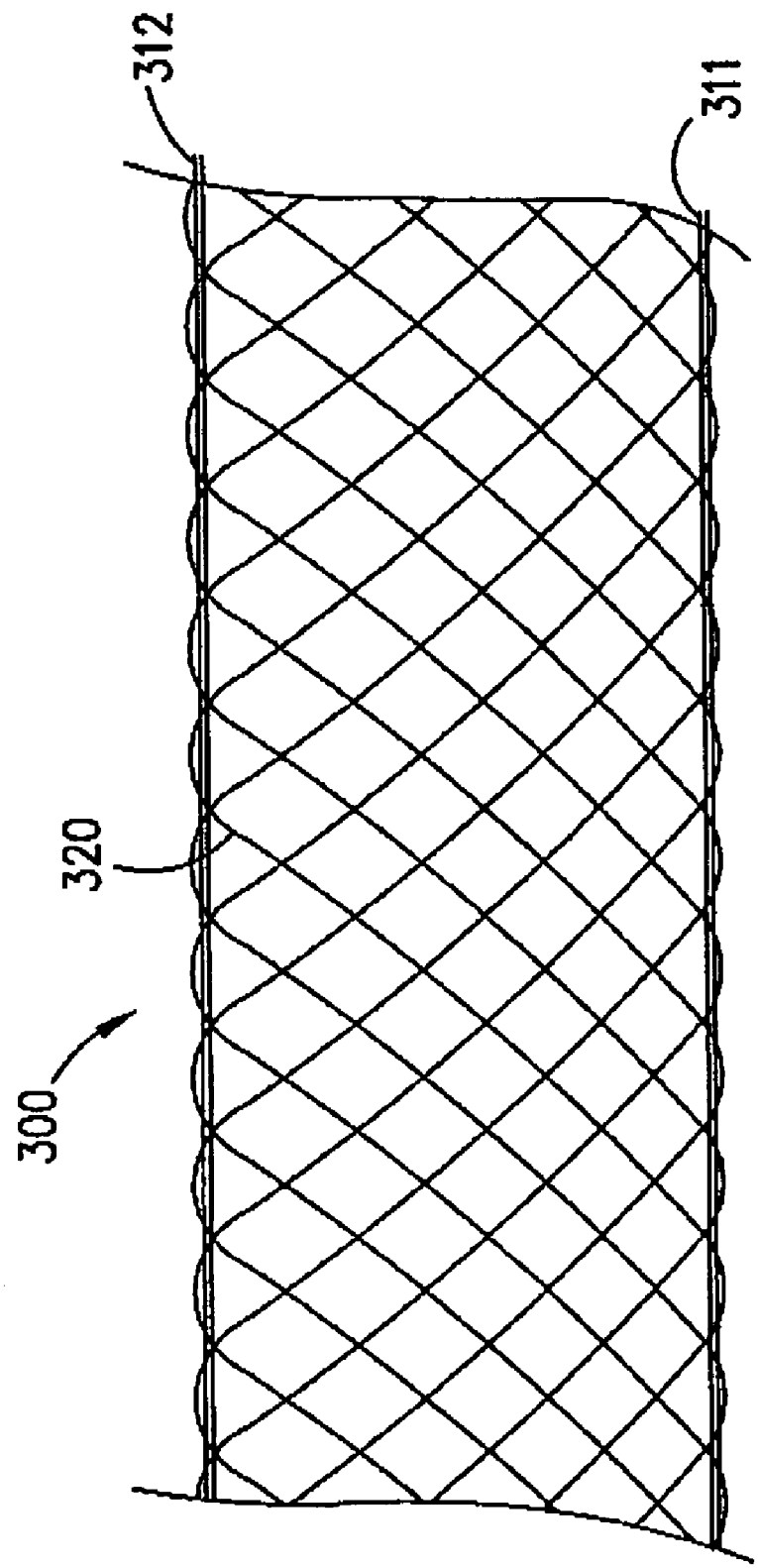
FIG. -5-

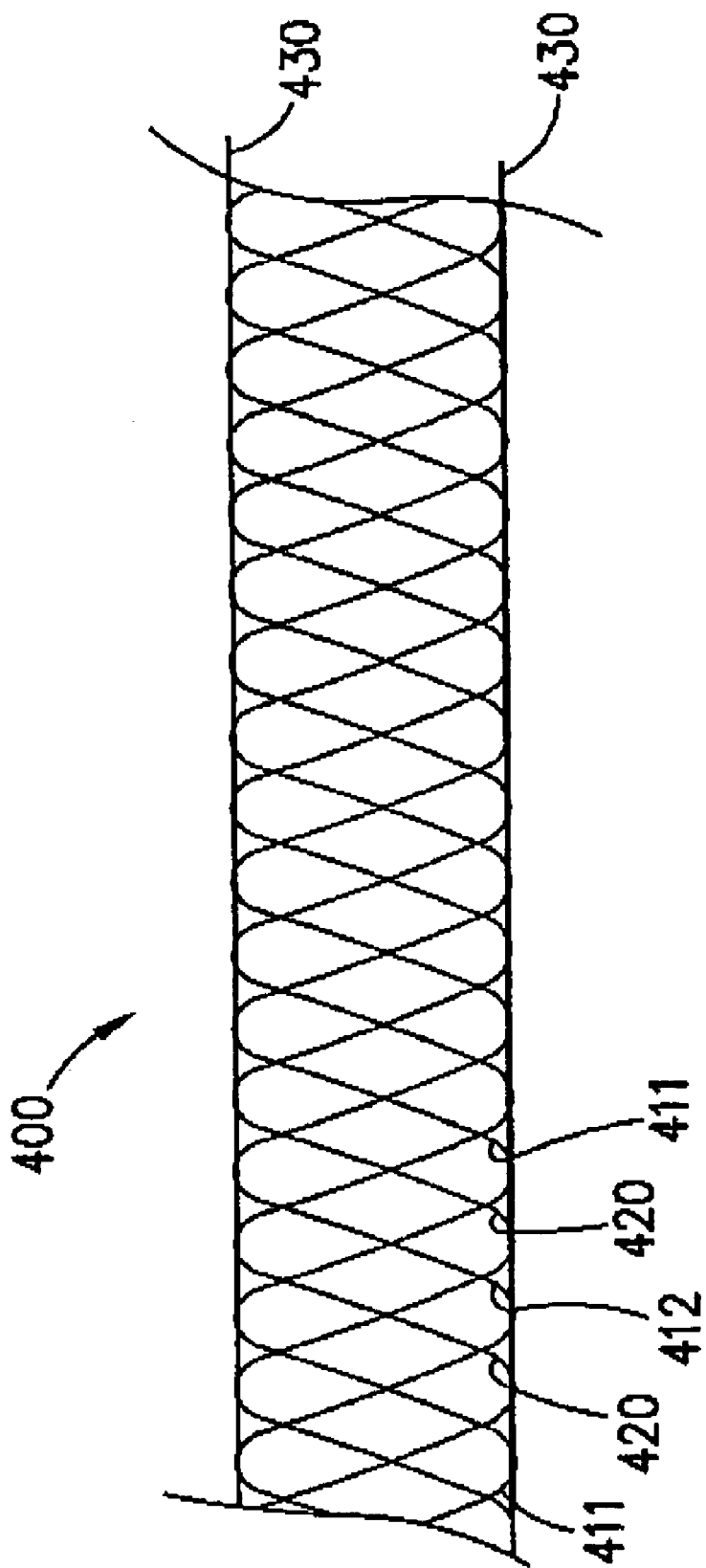
FIG. -6-

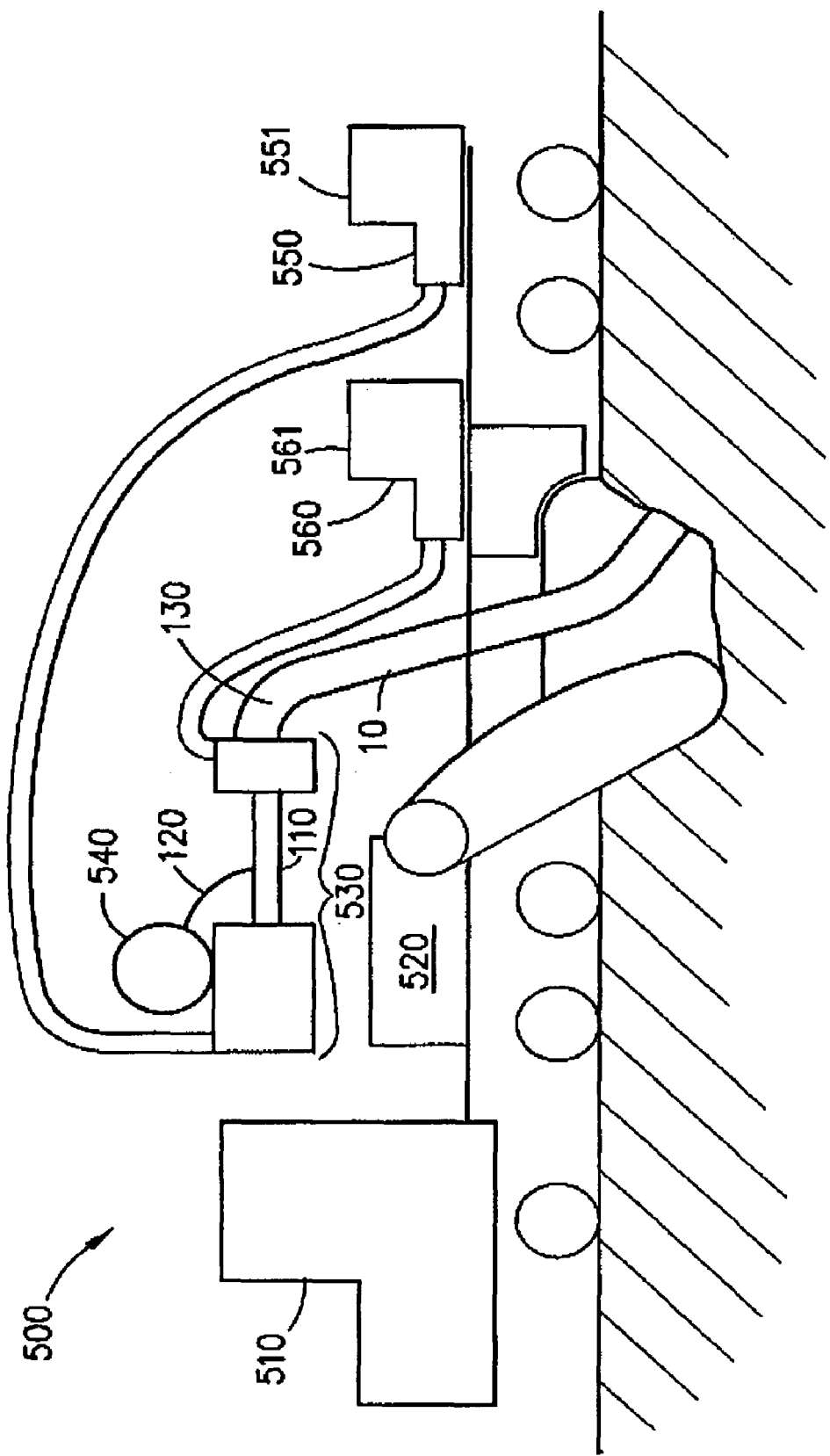
FIG. -7-

METHOD OF ON-SITE PRODUCTION OF NOVEL TEXTILE REINFORCED THERMOPLASTIC OR THERMOSET PIPES

FIELD OF THE INVENTION

The present invention generally relates to novel thermoplastic pipes which can withstand a varied range of internally generated and/or applied pressures for utilization within, primarily, underground liquid and gas transport systems. Such pipes are improvements over standard metal (i.e., steel, lead, and the like) pipes due to construction costs, shipping costs, implementation costs (particularly underground), modulus strength allowances to compensate for underground movements (i.e., earthquakes and tremors), non-rusting characteristics, and ease in manufacture. Such pipes are preferably reinforced with specific fabric articles that permit a lower thickness of plastic to be utilized than is generally required to withstand high pressure situations. A simplified, potentially on-site production method is also contemplated within this invention.

BACKGROUND OF THE INVENTION

Underground transport of liquids and gases has been utilized for many years. Such underground transport has proven to be the most efficient and safest manner in which to transport potentially explosive, flammable, and/or toxic liquids (such as crude oil, for example) and gases (such as methane and propane, as examples) long distances. The principle method followed to provide such long distance underground transport has been through metal tubes and pipes. In the past, the utilization of metals (such as steel, copper, lead, and the like) was effective from cost and raw material supply perspectives. However, with the population growing throughout the world and the necessity for transporting liquids and gases to more remote locations increases, the continued utilization of such metal articles has become more and more difficult for a number of reasons. Initially, the production of such metal tubes and pipes must be undertaken through high-temperature production methods at specific foundries which are normally located a substantial distance from the desired installation site. Such off-site production thus requires transport of cumbersome metal articles to the installation location and then subsequent placement into already-dug channels. These procedures are, again, difficult to follow since metal articles are rather heavy and must be connected together to form the desired pipeline. Additionally, in order to reduce the number of connections between individual pipes, longer metal pipes could be formed, which adds to the complexity with an increase in required welded connections. Further problems associated with metal pipes and tubes include, without limitation, the potential for rusting (which may contaminate the transported liquid or gas), the low threshold of earth-shifting which could cause a break within the pipeline, and the difficulty in replacing worn out metal pipes in sections, again due to the metal pipe weight, metal pipe length, and connection welds. These break problems have proven to be extremely troublesome in certain geographic areas which are susceptible to earthquakes and tremors on a regular basis. When such unexpected quakes have occurred in the past, the metal gas and liquid pipelines have not proven to be flexible enough to withstand the shear forces applied thereto and explosions, leaks, or discontinued supplies to such areas have resulted. These metal articles have remained in use because of their ability to withstand high pressures. Furthermore, although such metal pipes are designed to withstand such high pressures (i.e., above 80 bars, for instance), once a crack develops within the actual metal pipe structure, it has been found that such cracks easily propagate and spread in size and possibly number upon the application of continued high pressure to the same weakened area. In such an instance, failure of the pipe is therefore imminent unless closure is effectuated and repairs or replacements are undertaken.

Although there is a need to produce new pipelines to remote locations around the world, there is also a need to replace the now-deteriorating pipelines already in use. Aging pipelines have recently caused great concern as to the safety of utilizing such old articles. Unexpected explosions have occurred with tragic consequences. Thorough review and replacement of such old metal pipes is thus necessary; however, due to the difficulties in determining the exact sections of such pipelines which require replacement, there is a desire to completely replace old pipelines but following the same exact routes. Again, due to the difficulties noted above, there is a perceived need to develop more reasonable, safer, longer-lasting, easier-to-install, non-rusting, non-crack propagating, and more flexible pipeline materials. To date, there have been some new thermoset or thermoplastic articles which are designed to withstand rather low pressure applications (i.e., 20 bars or below) and which include certain fiber-wound reinforcement materials (including fiberglass, polyaramids, polyesters, polyamides, carbon fibers, and the like). However, the resultant articles do not include specific textile reinforcements (they are fibers wound around specific layers of plastic material) and thus are difficult and rather costly to produce. Furthermore, such fiber-wound materials cannot be easily produced at the pipe installation site again due to the complexity of creating fiber-wound reinforcement articles subsequent to thermoplastic or thermoset layer production. Additionally, with such off-site production, transport and in-ground placement remain a difficult problem. Thus, although some improvements have been provided in the past in relation and in comparison to metal pipes and tubes, there simply is no viable alternative presented to date within the pertinent prior art which accords the underground liquid and gas transport industry a manner of replacing such high pressure metal articles.

OBJECTS OF THE INVENTION

It is thus an object of this invention to provide such a viable alternative method for replacing or overcoming the shortcomings and difficulties of high pressure (i.e., from about 20 to about 100 bars) underground metal pipes and tubes. Another object of this invention is to provide a suitable fabric reinforcement system which permits a relatively low amount of thermoplastic or thermoset composition to be utilized in order to produce a pressure-resistant thermoplastic pipe article. Yet another object of this invention is to provide an interlocking mechanism to best ensure the textile reinforcement layer remains in place during and after introduction of the outer thermoplastic or thermoset layer. Still another object of this invention is to provide a suitable simplified method of producing such a textile-reinforced thermoplastic pipe article.

SUMMARY AND BRIEF DESCRIPTION OF THE INVENTION

Accordingly, this invention encompasses a pipe comprising at least two distinct layers of thermally manipulated polymeric material and at least one layer of textile reinforcement material, wherein said textile reinforcement material is sandwiched between said two distinct layers of said thermally manipulated polymeric material, wherein the elongation at break exhibited by such a pipe is limited solely to the elongation at break exhibited by said textile reinforcement material, and wherein said textile reinforcement material exhibits an elongation at break of at most 20%, preferably at most 15%, more preferably at most 10%, and most preferably at most 6%. Preferably said pipe is constructed to withstand at least 100 bars of internal pressure before exceeding the elongation at break limit. An alternative yet also preferred embodiment is a pipe which exhibits at most 20 bars of pressure of internal pressure before exceeding the elongation at break limit and a wall thickness of said polymeric material of at most $1/11$th of the diameter of said pipe, preferably at most about $1/15^{th}$, more preferably at most about $1/20$, and most preferably at most about $1/25$th. Also contemplated within this invention is the pipe as noted above wherein the textile reinforcement material introduced within said pipe is a flat structure having a first side and a second side which is formed into a tubular structure around the inner polymeric layer upon overlapping contact of said first and second sides and which possesses means to adhere or interlock said overlapped first and second sides.

The term "thermally manipulated polymeric material" is intended to encompass the well known polymeric compositions of a) thermoplastics and b) thermosets. Such terms are well known and describe a) any synthetic polymeric material that exhibits a modification in physical state from solid to liquid upon exposure to sufficiently high temperatures and b) any synthetic polymeric material that exhibits orientation in a preselected configuration upon exposure to sufficiently high temperatures. Most notable of the preferred thermoplastic types of materials are polyolefins (i.e., polypropylene, polyethylene, and the like), polyester (i.e., polyethylene terephthalate, and the like), polyamides (i.e., nylon-1,1, nylon-1,2, nylon-6 or nylon-6,6), and polyvinyl halides (i.e., polyvinyl chloride and polyvinyl difluoride, as merely examples). Preferred within this invention are polyolefins, and most preferred is polypropylene. Such materials are generally petroleum byproducts and are readily available worldwide. These materials are produced through the polymerization of similar or different monomers followed by the melt extrusion of the polymerized materials in pellet form into the desired shape or configuration. Upon solidification through cooling, such materials exhibit extremely high pressure resistance, particularly upon introduction of nucleating agents, such as substituted or unsubstituted dibenzylidene sorbitols, available from Milliken & Company under the tradename Millad®, and/or certain sodium organic salts, available form Asahi Denka under the tradename NA-11™. Such nucleating agents are either mixed and provided within the pelletized polymers, or admixed within the melted polymer composition prior to extrusion. These compounds provide strength enhancements and accelerate thermoplastic production by producing crystalline networks within the final thermoplastic product upon cooling at relatively high temperatures. Theoretically, at least, with a stronger initial thermoplastic product, the more durable and potentially longer functional lifetime provided by such a product. Preferred thermoset materials include materials such as polyurethane, polycarbonate, or the like.

Since pipe diameters utilized for largescale underground transport applications are generally measured in feet rather than inches or millimeters, the wall thicknesses required to provide the desired high pressure characteristics are extremely high for thermoplastics or thermosets alone. Although such thermoplastic and/or thermoset materials provide certain pressure resistances, in general the wall thickness required to withstand pressures of about 80 bars requires a standard diameter to wall thickness ratio of at most 11:1 (for polyethylene for example). Thus, in order to provide such high pressure characteristics without exceeding the elongation at break limits of the polymeric materials present in pipe form (i.e, substantially cylindrical), with pipe diameter of, for example, about 232 millimeters (about 9 inches), the wall thickness of the pipe must be at least about 21 millimeters, or about 0.85 inches) to withstand such high pressures. Even with such thick walls, the polymeric materials would not provide any resistance to crack propagation should a weakened area of the pipe produce such a burst point. There is a strong desire to increase the pressure resistance (and thus consequently, the elongation at break characterstics) of the target polymeric pipe material in order either to provide much thinner wall thicknesses without a loss in pressure resistance as compared with the standard polymeric materials alone, or to provide greater pressure resistant thick-walled pipes which are more reliable upon exposure to very high pressure situations. Such desirable benefits have been unavailable through practice of a relatively simple manufacturing method with actual textile reinforcement materials providing the basis of pressure resistance for the entire pipe article.

Apparently, upon application of internal pressure within such non-reinforced thermoplastic and/or thermoset piping materials, the materials expand in the direction dictated by the pressure therefore thinning the wall thickness either to the point of breaking (i.e., to the elongation at break limit) or until the pressure is discontinued. After discontinuing the pressure, however, the pipe walls do not return to their original thicknesses. Also, if the pressure is applied unevenly, or if there is a discrete area within the thermoplastic or thermoset pipe wall which is already thinner than the other areas, then the pipe will more easily burst in relation to the pressure buildup or in relation to the thinner wall portion. In order to alleviate such detrimental expansion and burst possibilities within thermoplastic piping materials, reinforcing materials have been developed to compensate for such problems. However, in the past, such piping materials have been limited primarily to hoses and short tubes (i.e., automobile tubing) which did not require the ability to withstand extremely high pressures.

It has now been found that the incorporation of certain textile reinforcement materials permit reduction of the diameter to wall thickness ratio for standard thermoplastic and/or thermoset materials by at least a factor of 1.5 (a ratio for any thermoplastic of at the most 1:17 in order to withstand a pressure of at least 80 bars). Preferably, then, the thickness of the inventive pipe walls should be no greater than about $1/17^{th}$ of the pipe diameter; more preferably no more than about $1/20^{th}$, and most preferably no greater than about $1/25^{th}$ of the pipe diameter. The term "withstand pressure" is intended to encompass the ability to prevent elongation of the entire pipe material to a point of breaking or weakening in discrete areas (i.e., thinning of certain areas to permit leakage). Such ability to withstand pressure is imperative since the utilization of high pressures internally provides a consistent and continuous force seeking equilibrium with the external pressures. Any excess thinning of the pipe material would therefore most likely result in bursting of the pipe due to physical requirements of equaling pressures. Such textile reinforcement materials thus aid in the reduction of elongation of the thermoplastic or thermoset pipe components upon application of high pressures therein. As noted previously, it has been determined that the elongation at break of such textile reinforcements provides the overall elongation at break exhibited by the target pipe article, particularly upon the presence of such reinforcement materials between at least two distinct layers of thermoplastic or thermoset materials. In such a manner, the entire article relies primarily upon at least one textile reinforcement layer to provide the desired high elongation at break limit and the low crack propagation exhibited by the reinforced thermoplastic or thermoset material. Furthermore, such a reinforcement material also aids in providing an increased tear resistance to the overall pipe article which aids in reducing the chances of a breach in structural integrity as a result of external shear force application (i.e., earth tremors, and the like). Since there is strict reliance upon such properties exhibited and provided by the textile reinforcement layer, the amount of thermoplastic or thermoset materials can be substantially reduced with no reduction in reliability under pressurized situations. Also, if so desired, the user may still utilize a substantial amount of thermoplastic or thermoset material in combination with the sandwiched textile reinforcement layer or layers with confidence that, again, the inventive pipe article will exhibit improved and reliable pressure resistance, crack propagation resistance, and tear resistance.

Of enormous importance in this instance is the flexibility exhibited by the inventive pipes when subjected to external shear forces, for example earth tremors, and the like. Such flexibility permits the pipes to exhibit some movement in relation to the shear forces generated by such external occurrences. In the past, as noted above, metal pipes suffered from the lack of flexibility in that the application of such external shear forces would result in the burst of certain pipes due to such external forces exceeding the shear force threshold possessed by the metal materials. Such flexibility is most suitably measured in terms of tear resistance to the overall pipe article. In general, metal pipes exhibit at most a tear resistance of about 6% (copper exhibits the highest such tear resistance), which is extremely low when the potential for very strong shear forces underground are significant (particularly in certain parts of the world prone to earth tremors, earthquakes, and the like). The thermoplastics and/or thermosets provide initial tear resistance measurements in excess of at least 20%, with a potential high measurement of more than about 100%, particularly upon incorporation of the sandwiched textile reinforcement material as discussed above. Thus, the inventive pipes should be able to withstand enormous shear forces, at least better than metal pipes, due to their exhibited tear resistance and thus flexibility characteristics.

As noted above, at least two layers of such thermoplastic and/or thermoset materials are present within the inventive thermoplastic and/or thermoset pipes. These layers are separated, at least in part, by a textile reinforcement material. The total wall thickness of the inventive pipe, as noted above, is dependent upon the discretion of the producer and in relation to the properties provided by the textile reinforcement layer itself. If a thin-walled, low pressure pipe is desired, then the typical wall thickness may be anywhere from about 4 to about 15 millimeters. A higher elongation at break characteristic exhibited by the textile reinforcement permits lower thicknesses to be utilized. Such elongation at break characteristics are generally measured by the amount of force such textile reinforcements may withstand. Thus, a textile exhibiting at least an elongation at break of about 2-3% (i.e., similar to that exhibited by steel but greater than for most thermoplastic and/or thermoset compositions) is desired. Of course, textile materials exhibiting far in excess of this elongation at break minimum are more preferred, with no real maximum level, only that which may deleteriously affect the overall stiffness of the product, thereby potentially providing tear resistance problems. The elongation at break level for preferred textile reinforcements is determined by a number of factors, including the tenacity of the constituent fibers within the textile (a higher dtex provides a stronger textile overall), the angle of contact in relation to the direction of the pipe (angles of form 40 to 70° are preferred, while specific angles of between 45 and 65° and 50 and 55° are more preferred, respectively. An angle of specifically 54° 44' has been found to provide the greatest overall strength to the target pipe article. Thicker layers of textile reinforcement material also appear to provide stronger overall products, as do scrim and in-laid textiles.

The term "textile reinforcement material" or "textile reinforcement" or "textile reinforcement layer" simply requires a combination of individual yarns or fibers in a configuration which is an integrated two-dimensional article prior to incorporation between the at least two layers of thermally manipulated polymeric materials. Thus, wound strips incorporated over a completed inner layer is not encompassed within such a definition. Nor are fiber-containing tape articles which are also wound around a formed polymeric pipe article. The specific textile reinforcement materials may be of any particular configuration, shape, and composition. The inventive textile reinforcements are present as at least a single layer of material with a total aggregate thickness of at least about 500 microns, preferably at least about 400 microns, more preferably at least about 300, and most preferably up to about 300 microns. Such textiles preferably exhibit a mesh structure between the two layers of thermoplastic and/or thermoset materials. In general, it is highly desired that synthetic fibers, either alone, or in conjunction with metal threads, be utilized within the reinforcement materials. Such synthetics are less likely to be susceptible to deterioration over time due to potential presence of bacteria, moisture, salts, and the like, within and around the pipes as they would be positioned underground. However, with the proper precautions of proper coating, finishing, and the like, natural fibers may serve this purpose as well. The preferred textile reinforcements may be knit, scrim, woven, non-woven, in-laid, and the like, in form, with scrim and in-laid textiles most preferred. Such forms are most easily produced and maneuvered during the actual pipe production procedure. With in-laid textiles, at least two layers are desired to have one layer oriented at one angle and the other its complement in relation to the direction of the target thermoplastic pipe. Thus, one layer would be placed with all yarns and/or fibers oriented at an angle of about 54° 44' to the pipe direction, the other oriented at an angle of about −54' 44'. In order to more easily hold such in-laid fabric layers in place, a thermoplastic film may be applied either between or on top of one or both layers. Such a film is preferably extremely thin (i.e., less than about 200 microns, preferably less than 100 microns, and most preferably less than about 50 microns) and, being a thermoplastic, will easily react with the outer layer of thermoplastic upon heating and molding around the inner layer/fabric reinforcement composite. Alternatively, sewn threads may be utilized to hold such multiple layers in place prior to, during, and after pipe production.

The yarns within the specific textile reinforcement materials may be either of multifilament or monofilament and preferably possess a relatively high dtex, again, to provide the desired tenacity and strength to the overall pipe article.

A range of decitex of from about 200 to about 24,000 is therefore acceptable. Mixtures of such individual fibers may be utilized as well as long as the elongation at break of the complete textile reinforcement material dictates the elongation at break for the complete thermoplastic and/or thermoset article. Multifilament fibers are preferred since they provides better adhesive properties and greater overall strength to the textile. The individual fibers may be of polyester, polyamide, polyaramid, polyimide, carbon, fiberglass (silicon-based, for example), boron-derivative, and possibly, polyolefin, in nature. Again, natural fibers, such as cotton, wool, hemp, and the like, may be utilized but are not as trustworthy as the synthetic types listed above. Due to high processing temperatures associated with polymeric pipe extruding, it is highly desirable to avoid the sole utilization of low melting-point polyolefin yarns. However, a plurality of individual fibers of such polyolefins (i.e., polypropylene, polyethylene, and the like) may be utilized in combination with the other synthetic fibers in order to improve adhesion upon melting of such yarns upon exposure to the higher temperatures present during the contacting of the textile reinforcement to the thermoplastic and/or thermoset inner and outer layers. Fiberglass and boron-derivatives are preferred due to their strength characteristics and their alkaline resistance. The remaining fibers are also acceptable, including, most prominently, polyaramids, polyimides, carbon fibers, and polyesters. Polyesters are desirable from a cost standpoint while the remaining fibers are excellent with regards to strength.

Of particular preference within this invention are yarns of core-sheath types, as taught within U.S. Pat. No. 5,691,030 to DeMeyer, herein entirely incorporated by reference. Such specific yarns permit breakage of the sheath components without affecting the strength of the core filaments therein. Such core filaments may be monofilament synthetic fibers (such as polyester, polyamides, polyaramids, polyolefins, and the like), although, in one potentially preferred embodiment, at least a portion of such core filaments are metallic in nature (such as, preferably, copper, silver, gold, and the like) in order to permit conduction of electrical current and/or heat over the entire pipeline. Such metal threads, fibers, yarns, etc., are not limited to being core filaments and thus may be present as distinct in-laid, woven, knit, no-woven, placed, scrim, components.

Such metallic components provide great strength as needed within the fabric reinforcement materials; however, they also may serve to provide other highly desirable benefits for both the inventive pipes and the overall pipeline comprising such pipes. For example, such conductive components may permit the introduction of a low electrical current over the entire pipeline (through a continuous connection of metal components) or through certain segments thereof. In such a manner, a detection system may be implemented to determine where and at what time a pipe has burst or a leak is present. Upon interruption of the desired electrical signal (i.e., the specific amps of current), a valve may be operated to close off a certain portion of the pipeline until repairs are made. Such a system merely requires the connection of an ampmeter to the pipeline and integration of a valve in relation to the measured amperage flowing through the pipeline itself. Furthermore, with such a detection system, the ability to detect such problems from aboveground would be provided as well as a signal in relation to a low amperage count can be produced thereby signifying the specific location of the problem. Such a method thus facilitates detection and replacement of such thermoplastic pipes.

Additionally, in certain locations freezing temperatures may provide difficulty in transporting certain gases and liquids underground without the ability to provide heated pipes. The presence of metal yarns, etc., facilitates the generation of heat, potentially, within the desired pipes with, again, the introduction of certain selected amounts of current and/or heat over the metal components. The heat generated thereby may be utilized to effectively keep the desired pipes from freezing thereby permitting continuous transport therethrough.

Even upon utilization of a fabric reinforcement material configured at the preferred angles noted above in relation to the pipe direction (i.e., 40 to 70°, most preferably 55°), the addition of a cross-yarn within each repeating design, stitch, pattern, etc., configured at an angle of 0° in relation to the pipe direction is highly desired. Such a cross-yarn permits melting of the entire pipe structure at discrete places in order to allow for curvatures to be introduced within the pipeline without deleteriously affecting the strength of the remaining fabric reinforcement material or compromising the shear strength of the entire pipe composite, particularly at the specific bent place. Such an improvement again shows the benefits of thermoplastic high pressure pipes since such curvatures may be produced at any angle and on-site on an as needed basis. Historically utilized metal pipes required formation of necessary curvatures at the foundry; if the angle of curvature was incorrect, new parts had to be produced to compensate for such a mistake. The inventive pipes permit on-site corrections if necessary.

It is desirable that the fabric reinforcement materials are in mesh form and thus exhibit open spaces between the constituent fibers and/or yarns therein. Such open space should be large enough to permit a portion of the heated liquid outer thermoplastic layer to adhere to the already formed inner thermoplastic layer therethrough and after cooling of the outer layer. In such a manner, not only is the three layer pipe stronger, the reinforcement materials are better held in place. Although larger open spaces between constituent fibers and/or yarns are preferred, the only requirement is that at least a portion of the outer layer exhibit some ability to adhere with the surface of the inner layer in contact with the fabric reinforcement materials. Thus, a range of preferred open space between individual constituent yarns of an area as low as 0.001 square millimeters and as high as about 1 square centimeter is desired.

The separate polymeric material layers and textile reinforcement layer may comprise any number of additives for standard purposes, such as antimicrobial agents, colorants, antistatic compounds, and the like. Such antimicrobial agents would potentially protect the inner lining from colonization of unwanted and potentially dangerous bacteria (which could potentially create greater pressure within the pipes if a proper nutrition source is present). Preferably, such an antimicrobial agent would be inorganic in nature and relatively easy to introduce within the thermoplastic compositions within the pipe. Thus, silver-based ion-exchange compounds (such as ALPHASAN®, available from Milliken & Company, and other types, such as silver zeolites, and the like) are preferred for this purpose. Colorants may be utilized to easily distinguish the thermoplastic layers for identification purposes. Any pigment, polymeric colorant, dye, or dyestuff which is normally utilized for such a purpose may be utilized in this respect for this invention. Antistatic compounds, such as quaternary ammonium compounds, and the like, permit static charge dissipation within the desired thermoplastic materials in order to reduce the chances of instantaneous spark production which could theoretically ignite certain transported gases and/or liquids. Although the chances of such spark ignition are extremely low, such an additive may be necessary to aid in this respect.

Such fabric reinforcement materials provide the aforementioned resistance to expansion, swelling, and/or burst due to the application of extremely high internal pressures within the target thermoplastic pipe material. Preferably, the fabric reinforcement material is configured at an angle of about 55° (54° 44') in relation to the direction of the target pipe itself. In such a manner, the fabric provides the best overall strength and thus resistance to internal pressures due to its resistance to shear forces generated by the internal pressure within the pipe. Depending on the amount of fabric utilized, however, the angle of contact may be as low as 0° and as high as 90°. With an angle configured in the same direction as the pipe itself, there is a higher risk of pipe burst due to the low shear force threshold provided by the fabric. Thicker fabrics may compensate for such shear force problems; however, the actual angle of contact should be from about 40 to about 70°, with the particular 54° 44' angle most preferred. Furthermore, the number of fabric layers utilized may be plural to provide greater reinforcement strength. In such an instance, it is highly desirable that contacting layers of fabrics be configured at opposite angles of contact in relation to the pipe direction to accord, again, the strongest reinforcement possible. The utilization of a supplemental textile reinforcement layer oriented at an angle of contact with the pipe direction of either 0 or 90° imparts certain desirable properties to the overall pipe article. Most notably, crush resistance is provided to ready-made pipes which are necessarily wound on a creel for transport to an installation site. A 0° reinforcement angle provides the best stiffness to compensate for the weight generated by rolled pipes. Also, should an initial production of the inner layer be desired in roll form, the incorporation of such a 0° textile reinforcement component may alleviate crushing problems associated with such storage and transport. A 90° orientation improves upon the tear resistance of the final product.

Although only two specific layers of thermoplastic and/or thermoset materials are required, it is to be understood that more than two such layers are acceptable within this invention. Such additional layers may be of any type (and not necessarily thermoplastic and/or thermoset), including, without limitation, metal, ceramic, glass-filled plastic, rubber, and the like.

Other alternatives to this inventive article will be apparent upon review of the preferred embodiments within the drawings as discussed below.

BRIEF DESCRIPTION OF THE DRAWINGS

These and other features, aspects, and advantages of the present invention will become better understood with regard to the following description, appended claims, and accompanying drawings, where:

FIG. 1 shows an embodiment of the present invention illustrated as the pipe 10;

FIG. 2 shows a cross-section of the pipe 10 from FIG. 1;

FIG. 3 shows a partial cross-sectional view of an apparatus for forming the pipe from FIG. 1;

FIGS. 4A-H illustrate cross-sectional views of the apparatus and pipe from FIG. 3, illustrating the method of joining a reinforcing fabric with an inner wall;

FIG. 5 illustrates a partial view of a textile for use in forming the pipe from FIG. 1 with the apparatus in FIG. 3;

FIG. 6 illustrates a textile for use as the reinforcing fabric for forming the pipe from FIG. 1 with the apparatus in FIG. 3; and FIG. 7 illustrates an apparatus for the in situ formation and placement of the pipe from FIG. 1.

DETAILED DESCRIPTION OF THE DRAWINGS

Reference will now be made in detail to potentially preferred embodiments of the invention, examples of which have been illustrated in the accompanying drawings. It is to be understood that these are in no way intended to limit the invention to such illustrated and described embodiments. On the contrary, it is intended to cover all alternatives, modifications and equivalents as may be included within the true spirit and scope of the invention as defined by the appended claims and equivalents thereto.

Referring now to the figures, and in particular to FIGS. 1 and 2, there is shown a pipe 10 illustrating one embodiment of the present invention. The pipe 10 generally includes an inner wall 110, a reinforcing textile 120, and an outer wall 130. The inner wall 110 is preferably formed of a thermoplastic material, and has an inner passage surface 111 and an inner wall textile interface zone 113. The inner passage surface 111 defines the interior of the pipe 10. The outer wall 130 is preferably formed of a thermoplastic material, and has an outer surface 133 and an outer wall textile interface zone 131. The reinforcing textile 120 wraps around the inner wall 110 and engages the inner wall textile interface surface 133. The reinforcing textile 120 has a sufficient width to surround the inner wall 110, and have textile overlap sections 121 where the edges of the reinforcing material overlap around the inner wall 110. A textile locking system 123 is employed between the textile overlap sections 121 to prevent the ends of the reinforcing material 120 from separating. The outer wall textile interface surface 131 engages the reinforcing textile 120 and the outer wall surrounds the reinforcing textile 120. Such a textile locking system 123 may alternatively comprise an adhesive composition (such as, as merely example, heat-activated or pressure-activated adhesives) which permits a secure, long-term connection between the overlap sections 121 and thus prevents separation of the two sections upon pipe production and potential elongation caused by high internal pressures.

Referring now to FIG. 3, there is shown a cross section of an apparatus 200 for forming the pipe 10 in FIGS. 1 and 2. The apparatus 200 generally includes an inner wall die 210, a mandrel 220, a reinforcing textile guide 230, and an outer wall die 240. The inner wall die 210 has an inner wall die aperture 211. The mandrel 220 extends through the inner wall die aperture 211 and includes an outer surface 221 for forming the inner passage 111 of the pipe 10 and providing support to the inner wall 110 during the formation of the pipe 10.

Still referring to FIG. 3, the reinforcing textile guide 230 is positioned around the mandrel 220 after the inner wall die 210. The reinforcing textile guide 230 includes an inside textile guide 231 and an outside textile guide 232 for guiding the edges of the reinforcing textile 120 to position the reinforcing textile 120 around the inner wall 110. In one embodiment of the apparatus 200, the reinforcing textile guide 230 includes a joint material injector 235 that is located to insert a material between the overlap textile sections 121. In yet another preferred embodiment, the reinforcing textile guide 230 includes a closing roller 237 that presses the overlapping portions of the reinforcing textile 120 together.

Referring still to FIG. 3, the outer wall die 240 is located around the mandrel 220 and includes an inside die wall 241 and an outside die wall 245. The inside die wall 241 of the outer wall die 240 includes an inside die wall aperture 242 to receive the inner wall 110 and reinforcing textile 120 combination. The inside die wall aperture 242 has an inside die wall aperture taper 243 for assisting the inner wall 110 and reinforcing textile 120 combination to transition into the outer wall die 240. The outer wall die 240 also has an outside die wall 245 with an outside wall die aperture 246. A passage 223 in the mandrel 220 provides air pressure to the inside of the pipe 10 at a point after the outer wall die 240 forms the outer wall 130 on the pipe 10. A connecting chain 225 secures a plug 224 inside the pipe 10 seals to the mandrel 220 in order to maintain the pressure from the mandrel 220 within the pipe 10.

Referring now to FIGS. 1, 2, and 3, in operation, a thermoplastic material is extruded through the inner wall die aperture 211 onto the outer surface 221 of the mandrel 220 to form the inner wall 110 of the pipe 10. The outer surface of the mandrel 220 provides support to the inner wall 110 of the pipe 10 during the processes of applying the reinforcing textile 120 and the outer wall 130. After the inner wall 110 has been extruded onto the mandrel 220, the reinforcing textile guide 230 positions the reinforcing textile 120 onto the inner wall textile interface zone 113.

Referring now referring to FIGS. 3 and 4A-H, the inside textile guide 231 and the outside textile guide 232 guide opposing ends of the reinforcing textile 120 as the reinforcing textile 120 is positioned onto the inner wall textile interface zone 113. FIGS. 4A-H illustrate the sequence of how the reinforcing textile guide 230 apply the reinforcing textile 120 onto the inner wall textile interface zone 113 of the inner wall 110 in a sequential manner. The inside textile guide 231 first applies one edge of the reinforcing textile 120 to the inner wall 110 of the pipe 10. As the inner wall 110 of the pipe 10 progresses along the extruding apparatus 20, the outside textile guide 232 continues to wrap the reinforcing textile 120 around the textile interface zone 113 of the inner wall 110. In this manner, the reinforcing textile 120 surrounds the inner pipe 110 in a way that reduces the possibility of wrinkles in the reinforcing textile 120 or air pockets between the inner wall 110 and the reinforcing textile 120.

Still referring to FIGS. 3 and 4A-H, in one embodiment a textile locking system 123, in the form of a joint material 123a, is employed between the textile overlap sections 121 of the reinforcing textile 120 to assist the reinforcing textile 120 to remain locked in an overlap position when the finished pipe 10 is subjected to internal pressures. The joint material 123a is injected between the textile overlap sections 121 by the joint material injector 235 just prior to the position that the outside textile guide 232 joins together the textile overlap sections 121. The joint material 123a can be the same type of material that is used to form the inner wall 110, the outer wall 130, or a different material selected to help secure the textile overlap sections 121 from separating. In another embodiment, the joint material 123a is a tape, ribbon, strand, or the like that is placed into position between the textile overlap sections 121 prior to the textile guide 230 joining together the textile overlap sections 121.

In an alternative yet preferred embodiment, the textile locking system 123 is a mechanical locking system utilizing mechanical devices such as hooks, piles, or other mechanical mechanisms. In a version of the textile locking system incorporating hook devices, a plurality of hook devices extending up from the lower textile overlap section 121 into the upper textile overlap section 121, down from the upper textile overlap section 121 into the lower textile overlap system, or both. The textile locking system 123 using hook devices can use hook devices similar to the hook devices in a hook and pile closure system. In a version of the textile locking system 123 that employs a pile type element, the pile type element can extend from the lower textile overlap section 121 into the upper textile overlap section 121, from the upper textile overlap section 121 into the lower textile overlap section 121, or both. The textile locking system 123 using a pile type element can have a pile type element formed from the same fibers or yarns of the reinforcing material, and can also have the pile elements canted to angle back towards the center of the reinforcing textile 120. In another embodiment, the textile locking system 123 employing a mechanical device can incorporate the mechanical device onto a ribbon, strip, strand, or the like that is placed into position between the textile overlap sections 121 prior to the textile guide 230 joining together the textile overlap sections 121. The textile locking system 123 employing a mechanical device in the form of a ribbon, strip, strand, or the like, the locking system 123 can also be positioned below the lower textile overlap section 121 and extend up into both textile overlap sections 121, or above the upper textile overlap section 121 and extend down into both textile overlap sections 121. Additionally the textile locking system can employ both the joint material 123a and the mechanical systems described above.

Referring back now to FIG. 3, once the textile locking system 123 is located in place, the closing roller 237 presses the textile overlap sections 121 together in preparation for applying the outer wall 130. The outer wall 130 is formed around the inner wall 110 and reinforcing textile 120 combination by the outer wall die 240. The inner wall 110 and reinforcing textile 120 combination enters the outer wall die 240 through the inside wall aperture 242 of the outer wall die 240. The inside wall aperture taper 243 assists the inner wall 110 and reinforcing textile 120 combination transition into the outer wall die 240. A thermoplastic material is extruded into the outer wall die 240 and surrounds the inner wall 110 and reinforcing textile 120 combination. The inner wall 110, reinforcing textile 120, and outer wall 130 exit the outer wall die 240 through the outside die wall aperture 246 in the outside die wall 245. The outside wall die 240 is illustrated in FIG. 3 as being perpendicular to the pipe 10; however, it is contemplated that the outside wall die 240 can be at an angle such that the inside wall a inside die wall 241 and the outside die wall 245 form an acute angle to the inner wall 110 and reinforcing textile 120 combination entering the outer wall die 240. This acute angle facilitates the forming of the outer wall 130 on the pipe 10 and helps reduce the tendency of the thermoplastic material to leak out of the inside die wall aperture 242.

Still referring to FIG. 3, air pressure applied to the passage 223 in the mandrel 220 exits into the interior of the pipe 10 after the outer wall 130 has been formed. The plug 225 inside the pipe 10 helps retain the pressure inside the pipe 10. A connecting chain 227 holds the plug 225 adjacent to the mandrel 220. The pressure applied within the pipe 10 prevents collapse of the entire structure as the three layer pipe 10 hardens into its final shape. After hardening, the plug 225 is removed and the resulting pipe structure 10 is ready for utilization in tandem with other such pipes (not illustrated) as an entire high pressure pipeline (not illustrated).

Referring now to FIG. 5, there is shown a partial view of a textile 300 for use as the reinforcing textile 110 illustrated in FIGS. 1 and 2. The textile 300 includes electrode elements 311 and 312, and resistive elements 320. As illustrated in FIG. 5, the electrode elements 311 and 312 are conductive materials that run parallel along the length of the textile 300 as the selvage yarns. The resistive elements 320 are woven around the electrode elements 311 and 312, and interlaced to form a fabric. As an example, the resistive elements 320 can be a yarn formed of a flexible core having a fine resistance wire or tape wound spirally thereon, or having a layer of carbon particles bonded thereon by a thermoplastic or resin binder. The electrode elements 311 and 312, and the resistive elements 320 are flexible to form a fabric that can be placed around the inner wall 110 as the reinforcing fabric 120 illustrated in FIGS. 1 and 2.

Referring now to FIGS. 1-2 and 5, by using the textile 300 in FIG. 5 as the reinforcing fabric 120 in FIGS. 1 and 2, an electrical current can be applied to the electrode elements 311 and 312 of the fabric 300 when in place within the pipe 10. The electrical current supplied to the electrode elements 311 and 312 passes through the resistive elements 320 and generates heat. In this manner, the pipe 10 can be used to apply heat to the contents of the pipe 10, or to compensate for the loss of thermal energy from the contents of the pipe 10 to the exterior of the pipe.

Referring now to FIG. 6, there is shown another embodiment of a textile 400 for use as the reinforcing textile 120 of the pipe 10 in FIGS. 1 and 2. The fabric 400 generally comprises selvage yarns 430, electrode yarns 411 and 412, and resistive yarns 420. The electrode yarns 411 and 412 are woven around the selvage yarns 430 such that a resistive yarn 420 separates each electrode yarn 411 and 412. At each intersection of the electrode yarns 411 and 412, the electrode yarns 411 and 412 are insulated from making an electrical connection to each other. At each intersection of the resistive yarn 420 with one of the electrode yarns 411 and 412, the resistive yarn 420 is placed in electrical connection with the respective electrode yarn 411 or 412. In this manner, an electrical circuit is formed having the electrodes 411 and 412 interconnected by a series of segments from the resistive yarn 420, thus forming a parallel resistive circuit. The parallel resistive circuit can generate heat in a similar manner to the textile 300 by applying an electrical current between the electrode yarns 411 and 412. Additionally, any break in yarn electrode 411 or 412, will create a change in the electrical potential across the electrode yarns 411 and 412, indicating a location of the break. Therefore, a break within the pipe 10 causing a break of one of the electrodes 411 or 412, can be located by measuring the electronic potential across the electrode yarns 411 and 412.

In addition to the textiles 300 and 400 illustrated in FIGS. 5 and 6, a traditional woven or knitted textile having thermal generating elements can be incorporated as the reinforcing textile 120 illustrated in FIGS. 1 and 2. For example, a traditional woven fabric having selvage yarns, pick yarns, and filling yarns, can incorporate the thermal heating aspects of the textiles 300 and 400. The picks of a traditional woven fabric can be the resistive elements, and the selvage yards and/or fill yarns can be a conductive material. Alternatively, the fill yarns can be formed of a resistive material, and the pick yarns can be conductive yarns which are electrically supplied by conductive selvage yarns and/or conductive fill yarns. In yet another embodiment, the resistive yarns can be a combination of pick and fill yarns.

Referring now to FIG. 7, there is shown an apparatus 500 for the in situ formation and placement of an embodiment of the pipe from the present invention. The apparatus 500 includes a transportation device 510 such as a truck, a trench or ditch digging device 520 located on the transport device 510, and an apparatus for formation of the pipe 530 such as the pipe forming apparatus 20 in FIG. 3. A supply of reinforcing textile 540 (such as a roll of the reinforcing textile 120 in FIG. 1) is positioned with the transportation device 510 to supply the pipe forming device 530 with the necessary reinforcing material 120 to form the pipe 10. Additionally, an extruding device 550 with a plastic supply 551 is positioned with the transportation device 510 for supplying melted material to the inner wall dye 210 of the pipe forming apparatus 200 for forming the inner wall 110 of the pipe 10. A second extruding device 560 with a material supply 561 extrudes material and supplies the material to the outer wall die 240 of the pipe forming apparatus 530 for forming the outer wall 130 of the pipe 10. Although the two extruding devices 550 and 560 have been illustrated as a separate supply, it is contemplated that the two extruding devices could be a single extruding device.

Still referring to FIG. 7, the ditch or trench digging device 510 removes material from the ground for placement of the pipe 10. The extruding apparatus 520 receives extruded material from the extrusion device 550, reinforcing material 20 from the supply, and extruded material from the extrusion device 560 for forming the inner wall 110, reinforcing textile 120, and outer wall 130, respectively, of the pipe 10. The pipe 10 is positioned within the trench or ditch formed by the trench or ditch digging device 520 and earth is placed over the pipe 10 as necessary. The process is continuous allowing the transportation device 510 to form and place the pipe 10 in situ.

Having described the invention in detail it is obvious that one skilled in the art will be able to make variations and modifications thereto without departing from the scope of the present invention. Accordingly, the scope of the present invention should be determined only by the claims appended hereto.

What is claimed is:

1. An apparatus for the in situ formation and placement of a textile-reinforced pipe, said apparatus in combination comprising: a transportation device, on which said transportation device are located a trench forming device, a pipe forming device, a textile reinforcement material supply, and at least one extrusion material device; said pipe forming device having (a) an inner wall die for receiving a first layer of extruded material from the at least one extrusion material device and forming an inner wall, (b) a textile reinforcement material guide for receiving a textile reinforcement material from the the textile reinforcement material supply and positioning the textile reinforcement material on the inner wall, and (c) an outer wall die for receiving a second layer of extruded material from the at least one extrusion material device, wherein the textile reinforcement material has an open mesh structure, and wherein said trench forming device and said pipe forming device are positioned such that said pipe forming device positions a pipe within a trench formed by said trench forming device.

2. The apparatus of claim 1, wherein the textile reinforcement material has a construction selected from the group consisting of a knit construction, a woven construction, a non-woven construction, and an in-laid construction.

3. The apparatus of claim 1, wherein the textile reinforcement material has an elongation at break of about 2-3%.

* * * * *